Patented May 7, 1946

2,399,840

UNITED STATES PATENT OFFICE 2,399,840

METHOD FOR THE ISOLATION OF PENICILLIN FROM AQUEOUS SOLUTIONS

Jacques L. Wachtel, Peoria, Ill., assignor to the United States of America as represented by the Secretary of Agriculture No Drawing. Application August 18, 1943, Serial No. 499,160

11 Claims. (Cl. 260—236.5)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to a new and useful method for the isolation of penicillin from aqueous solutions containing the same in an impure condition.

As is known to those skilled in the art, penicillin is the extremely potent bacteriostatic agent produced by the metabolism of the fungus, *Penicillium notatum*, when it is grown on selected nutrient media. The original work of Fleming, Brit. J. Exp. Path., vol. 10, p. 226 (1929) and the more recent work of Abraham, et al., Lancet, vol. 2, p. 226 (1940) and Lancet, vol. 2, p. 177 (1941) describe the culture of *Penicillium notatum* and the properties of penicillin. The chemical structure of penicillin is not yet known, but the substance is clearly defined by its bacteriostatic properties and by its stability or lack of stability when subjected to various chemical or physical conditions.

Since penicillin is present in extremely small quantities in biological fluids, such as the fermentation liquor resulting from the culture of *Penicillium notatum*, or the urine excreted by animals to which penicillin has been administered, and since penicillin is, under many conditions, chemically unstable, numerous obstacles have been encountered in isolating, purifying, and concentrating this substance. The principal difficulties have been (1) incomplete removal of penicillin from the crude biological media in which it occurs, (2) destruction of the penicillin during processing, and (3) contamination of the final penicillin concentrate with impurities which have been carried along with penicillin through the various processing operations. The first two difficulties are associated with a loss of penicillin, which is obviously uneconomical and undesirable. The third difficulty leads to an impure product which, in addition to being of unpleasing appearance and of reduced biological potency, is likely to contain undesirable biologically active substances which limit the therapeutical application of the preparation.

Currently used procedures for the isolation, purification, and concentration of penicillin do not surmount these difficulties and, in addition, require uneconomical use of chemicals, equipment, and time. Thus, one procedure involves exhaustive extraction of the penicillin-containing fluid with organic solvents and subsequent partial purification of the penicillin by means of successive interchanges of it between aqueous buffer solutions and immiscible solvents. Another procedure involves adsorption of the penicillin from the aqueous penicillin-containing fluid onto activated carbon and its subsequent elution from the carbon with chloroform or aqueous solutions of acetone. Neither of these eluents is very selective, and the resulting penicillin preparations are grossly impure. Furthermore, in the aqueous acetone solutions employed, it is necessary that the acetone comprise 20 percent or more of the volume of the eluent liquor, in order to obtain efficient desorption of the penicillin from the carbon; eluates containing such a quantity of acetone cannot be extracted with organic solvents owing to the mutual solubilizing action of the acetone. It is therefore necessary to remove the acetone by evaporation or distillation in vacuo so as to prevent destruction of the penicillin; such vacuum operations are both time-consuming and costly.

I have found that organic aliphatic esters are good desorbing agents for the removal of penicillin from activated carbon, and that such esters are, to a high degree, specific in their desorbing action. This discovery, taken in conjunction with the favorable solvent properties of organic aliphatic esters with respect to water and to penicillin and its salts, makes possible a very economical and practical procedure for the isolation, purification, and concentration of penicillin.

Reports of other workers that activated carbon is a very efficient adsorbent for the removal of penicillin from impure aqueous solutions have been confirmed in my work. The contacting of the penicillin-containing solution and the activated carbon is best conducted at essentially neutrality (pH 7.0). Various types and sources of carbons have been found satisfactory: thus, Norite, Nuchar, Carboraffin, Suchar, Cliffchar, and Darco G–60 have all been found suitable. Following adsorption of the penicillin on the carbon, the latter is separated from the residual aqueous solution, preferably by filtration.

The separated carbon, containing penicillin adsorbed thereon, is suitable for treatment according to my invention. I have found that the penicillin is almost completely removed from the carbon, with a high degree of specificity, if the carbon is contacted with an organic aliphatic ester or with an aqueous solution of an organic aliphatic ester. The aqueous eluent, being unbuffered, will have a pH of substantially 5 to 7 before contacting the activated carbon; this degree of acidity is usually obtained upon mixing water and ester, and requires no special adjustment. The weight of aqueous ester solution used should, for the advantageous execution of subsequent operations, be held to a minimum; I secure good results by using eluent equal to 7 to 10 times the weight of the carbon. Elution is facilitated if agitation is provided throughout the contact period.

The presence of both ester and water appears to be necessary to secure the most efficient and the most selective desorption of the penicillin. The ester apparently desorbs the penicillin, replacing it on the activated carbon, while the water apparently acts as the solvent for the desorbed penicillin or its salts. Although I have, in general, found it advantageous to use saturated aqueous solutions of the esters as eluting agents, in some cases I have found it desirable to add to the mass undergoing elution, quantities of the ester in excess of that required to give a saturated aqueous solution; such additions of esters apparently favor or facilitate the desorption of the penicillin.

An alternative method of practicing my invention is to agitate the penicillin-containing carbon with water, and to add thereto, during mixing, such quantities of esters as will be required to desorb the penicillin. In most cases, these quantities will be found to be substantially equal to that necessary to give a saturated solution of the used ester in the water, however, in some cases somewhat more or less ester will be found to be effective, and accordingly my invention is not limited in this respect.

Still another alternative method of practicing my invention is the agitation of the penicillin-containing carbon with the ester, and thereafter adding to this suspension increments of water. The ester appears to desorb the penicillin from the carbon, but it appears necessary to supply the water as a solvent for the penicillin.

I have found that a wide variety of aliphatic esters are suitable for this application; this methyl formate, ethyl formate, ethyl acetate, n-butyl acetate, amyl acetate, iso-propyl propionate, ethyl acetoacetate, and diethylcarbonate have been found applicable. I prefer to use esters of low but definite solubility in water, for the reason that desorption appears to take place more readily when such esters are used; this can probably be attributed to the fact that the ester is brought into more intimate and more nearly continuous contact with the activated carbon when it is dissolved in the aqueous phase.

I have also found it possible to use, as the eluting agent, an aqueous solution of two or more esters; or I may contact the penicillin-containing carbon with a mixture of two or more esters and add thereto water to dissolve the penicillin.

My invention for the desorption of penicillin from activated carbon is suitable for operation as a batch process, or as a continuous, countercurrent process.

Since I have used, as the desorbing agent, aqueous solutions containing relatively small quantities of ester (in any event, much less than the 20 percent aqueous solution of acetone in current use) the eluate obtained from the practice of my invention is immediately suitable for treatment with organic solvents to remove penicillin, and no evaporation or similar concentration steps are required. The usual procedure is to cool the aqueous-ester eluate liquor to 0° to 5° C., adjust the pH to approximately 2.0 with a mineral acid, preferably phosphoric acid, and extract the penicillin from the eluate with any of the organic solvents commonly used in the art for this purpose. As typical solvents, there may be mentioned ethyl acetate, amyl acetate, chloroform, or butyl alcohol.

The penicillin is removed from any of the latter organic solvents by extracting the same with relatively small volumes of water, to which sodium bicarbonate is added in small increments so as to bring the pH to approximately 7.0. This solution, which contains penicillin as its sodium salt, is suitable for immediate therapeutic application, or it may be converted to a dry active powder by conventional methods.

I have found that the practice of my invention leads to a final product of a higher degree of purity than products previously or otherwise obtained, as evidenced by a higher penicillin assay value and the presence of considerably less color than products resulting from the application of other methods.

As illustrative of the manner in which my invention may be practiced, the following examples are given, although the exact details are to be considered in no way restrictive:

*Example 1*

Two liters of fermentation liquor obtained from the culture of *Penicillium notatum* and containing, according to microbiological assay, a total of 188,000 Oxford units of penicillin, was adjusted from pH 8.0 to pH 7.0 by means of phosphoric acid. After filtering this liquor to remove solid impurities, 30 grams of Darco G-60, a commercial activated carbon, was added slowly, with constant agitation supplied by means of an electrically driven laboratory stirrer. After 30 minutes agitation, the carbon was filtered from the fermentation liquor by means of a Buchner funnel. A microbiological assay showed that the residual fermentation liquor contained a total of only 12,000 units of penicillin; it was therefore discarded.

The carbon upon which the penicillin was adsorbed, was placed in 200 ml. of water saturated with ethyl acetate, to which sufficient ethyl acetate was then added to bring the total volume of ethyl acetate present to 30 ml. This suspension was agitated vigorously by means of a laboratory stirrer for fifteen minutes, and the carbon was then filtered off by suction. The filtrate, cooled to 0° C., was adjusted to pH 2.0 with phosphoric acid, and was then shaken in a separatory funnel with three one-third volume portions of cold amyl acetate. The separated and combined amyl acetate solution was shaken with 15 ml. of cold water to which a total of approximately 0.7 ml. of saturated sodium bicarbonate solution was added in small increments so as to bring the pH to approximately 7.0. Microbiological assay showed that the resulting aqueous solution contained a total of 114,000 Oxford units of penicillin, or 60 percent of that present in the fermentation liquor used for the recovery experiment.

*Example 2*

One liter of the same fermentation liquor used in Example 1 was adjusted to pH 7.0 and filtered, as described in the previous example. After filtering, fifteen grams of Carboraffin, a commercial activated carbon, was added slowly, with constant agitation as described in the preceding example. After fifteen minutes agitation, the carbon was filtered from the fermentation liquor, and the latter was tested by microbiological assay; it was found to contain a total of only 5000 Oxford units of penicillin, and was therefore discarded.

The carbon, upon which the penicillin was adsorbed, was placed in 105 ml. of a mixture composed of 100 parts of water and 5.0 parts of diethylcarbonate. The suspension was agitated vigorously by means of a laboratory stirrer. After five minutes, an additional 2.0 grams of diethylcarbonate was added to the stirred mixture, and after ten minutes stirring, another 2.0 grams of diethylcarbonate was added. Five minutes after the last ester addition, stirring was discontinued and the carbon filtered off. The filtrate was cooled to 2° C. and adjusted to pH 2.0 with phosphoric acid; it was then shaken with three 40 ml. portions of cold chloroform. The chloroform layers were drawn off and shaken with cold water and sodium bicarbonate, as described in the preceding example. Microbiological assay showed that the resulting aqueous solution contained a total of 60,000 Oxford units of penicillin or 64 percent of that present in the original fermentation liquor used.

Having thus described my invention, what I claim for Letters Patent is:

1. A method for the recovery of penicillin from aqueous fermentation liquor comprising adsorbing the penicillin from the neutralized and filtered fermentation liquor onto activated carbon, separating the carbon from the penicillin-free fermentation liquor, and eluting the penicillin from the activated carbon with an aqueous solution of an organic aliphatic ester having a substantial concentration of water.

2. A method for the recovery of penicillin from aqueous fermentation liquor comprising adsorbing the penicillin from the neutralized and filtered fermentation liquor onto activated carbon, separating the carbon from the penicillin-free fermentation liquor, and eluting the penicillin from the activated carbon with a water soluble organic aliphatic ester in the presence of a substantial concentration of water.

3. A method for the recovery of penicillin from aqueous fermentation liquor comprising adsorbing the penicillin from the neutralized and filtered fermentation liquor onto activated carbon, separating the carbon from the penicillin-free fermentation liquor, and eluting the penicillin from the activated carbon with an aqueous solution of a water soluble organic aliphatic ester having a substantial concentration of water to which are added, during the period of elution, additional quantities of a water soluble organic aliphatic ester possessing low but definite solubility in water.

4. A method for the recovery of penicillin from aqueous fermentation liquor comprising adsorbing the penicillin from the neutralized and filtered fermentation liquor onto activated carbon, separating the carbon from the penicillin-free fermentation liquor, and eluting the penicillin from the activated carbon by agitating the carbon with a liquid phase consisting of a substantial concentration of water and a water soluble organic aliphatic ester.

5. A method for the recovery of penicillin from aqueous fermentation liquor comprising adsorbing the penicillin from the neutralized and filtered fermentation liquor onto activated carbon, separating the carbon from the penicillin-free fermentation liquor, and eluting the penicillin from the activated carbon by agitating the activated carbon at a temperature of substantially 0° C. to 5° C. and at a pH of substantially 5.0 to 7.0, with a liquid phase consisting of a substantial concentration of water and a water soluble organic aliphatic ester.

6. A method for the recovery of penicillin from aqueous fermentation liquor comprising adsorbing the penicillin from the neutralized and filtered fermentation liquor onto activated carbon, separating the carbon from the penicillin-free fermentation liquor, and eluting the penicillin from the activated carbon by contacting the activated carbon with a substantial amount of water, adding thereto a water soluble organic aliphatic ester, and separating the desorbed activated carbon from the liquid phase containing penicillin.

7. A method for the recovery of penicillin from aqueous fermentation liquor comprising adsorbing the penicillin from the neutralized and filtered fermentation liquor onto activated carbon, separating the carbon from the penicillin-free fermentation liquor, and eluting the penicillin from the activated carbon by contacting the activated carbon with a water soluble organic aliphatic ester, adding a substantial amount of water thereto, and separating the desorbed activated carbon from the liquid phase containing penicillin.

8. A method for the recovery of penicillin from aqueous fermentation liquor comprising adsorbing the penicillin from the neutralized and filtered fermentation liquor onto activated carbon, separating the carbon from the penicillin-free fermentation liquor, and eluting the penicillin from the activated carbon with ethyl acetate in the presence of a substantial concentration of water.

9. A method for the recovery of penicillin from aqueous fermentation liquor comprising adsorbing the penicillin from the neutralized and filtered fermentation liquor onto activated carbon, separating the carbon from the penicillin-free fermentation liquor, and eluting the penicillin from the activated carbon with n-butyl acetate in the presence of a substantial concentration of water.

10. A method for the recovery of penicillin from aqueous fermentation liquor comprising adsorbing the penicillin from the neutralized and filtered fermentation liquor onto activated carbon, separating the carbon from the penicillin-free fermentation liquor, and eluting the penicillin from the activated carbon with amyl acetate in the presence of a substantial concentration of water.

11. A method for the recovery of penicillin from aqueous fermentation liquor comprising adsorbing the penicillin from the neutralized and filtered fermentation liquor onto adsorbent carbon, separating the carbon from the penicillin-free fermentation liquor, and eluting the penicillin from the adsorbent carbon with an aqueous solution of an organic solvent therefor having a substantial concentration of water.

JACQUES L. WACHTEL.